US007076521B2

(12) United States Patent
Davison

(10) Patent No.: US 7,076,521 B2
(45) Date of Patent: Jul. 11, 2006

(54) WEB-BASED COLLABORATIVE DATA COLLECTION SYSTEM

(75) Inventor: Jeff Davison, Rockledge, FL (US)

(73) Assignee: Vertical Computer Systems, Inc., Los Angeles, CA (US)

( * ) Notice: Subject to any disclaimer, the term of this patent is extended or adjusted under 35 U.S.C. 154(b) by 733 days.

(21) Appl. No.: 09/882,494

(22) Filed: Jun. 15, 2001

(65) Prior Publication Data

US 2003/0101238 A1 May 29, 2003

Related U.S. Application Data

(60) Provisional application No. 60/235,458, filed on Sep. 26, 2000, provisional application No. 60/214,067, filed on Jun. 26, 2000.

(51) Int. Cl.
*G06F 13/00* (2006.01)

(52) U.S. Cl. ........................... 709/203; 709/246
(58) Field of Classification Search ........ 709/200–203, 709/217–224, 246
See application file for complete search history.

(56) References Cited

U.S. PATENT DOCUMENTS

| 5,793,966 | A | * | 8/1998 | Amstein et al. ............. 709/203 |
| 5,886,693 | A | * | 3/1999 | Ho et al. ..................... 715/700 |
| 5,974,418 | A | | 10/1999 | Blinn et al. |
| 6,456,308 | B1 | * | 9/2002 | Agranat et al. ............. 715/854 |
| 6,529,501 | B1 | * | 3/2003 | Zhao et al. .................. 370/353 |
| 6,546,406 | B1 | * | 4/2003 | DeRose et al. ............. 715/513 |
| 6,604,100 | B1 | * | 8/2003 | Fernandez et al. ............. 707/3 |
| 6,785,673 | B1 | * | 8/2004 | Fernandez et al. ............. 707/3 |
| 2002/0046273 | A1 | * | 4/2002 | Lahr et al. .................. 709/224 |

OTHER PUBLICATIONS

Banerjee S., et al., "Oracle8I-the XML enabled data management system" Data Engineering, 2000. Proceedngs, 16th International Conference of San Diego, CA USA, Feb. 29-Mar. 3, 2000, Los Alamitos, CA, USA IEEE Computer Society, US, Feb. 29, 2000, pp. 561-568.
Cheng, J, et al: "XML and DB2" Data Engineering, 2000. Proceedings. 16th Int'l Conference on San Diego, CA, USA Feb. 29-Mar. 3, 2000, Los Alamitos, C, USA, IEEE Computer Society, US, Feb. 29, 2000, pp. 569-573.
Shi-Ming Huang, et al.: "Developing an XML gateway for business-to-business commerce" Web Information Systems Engineering, 2000. Proceedings of the First Int'l Conference on Hong Kong, China, Jun. 19-21, 2000, Los Alamitos, CA, USA, IEEE Comput. Soc., Jun. 19, 2000, pp. 67-74.
"A Process for the Blending of Web Content" Research Disclosure, Kenneth Mason Publications, Hampshire, GB, No. 432, Apr. 2000, pp. 778-779.
Shanmugasundaram J., et al: "Relational databases for querying XML documents: limitations and opportunities" Proceedings of the International Conference on Very Large Data Bases, Sep. 7, 1999, pp. 302-314.

* cited by examiner

*Primary Examiner*—Moustafa M. Meky
(74) *Attorney, Agent, or Firm*—Brown Raysman Millstein Felder & Steiner LLP

(57) ABSTRACT

The present invention is directed to a system for gathering data from a web-based server, transmitting the data to a web-based client, and storing the data on the web-based client. The web-based server translates data from a data supplier's proprietary data model into a data consumer's proprietary data model using a data mapping function. The web-based server also converts data from a structured data format to a markup language format. The web-based client periodically polls one or more data servers for data. The web-based client receives data in a markup language format and translates it into a structured data format, then stores it in a database. The web-based client and the web-based server can collaborate with each other to streamline the data conversion and translation process.

41 Claims, 16 Drawing Sheets

| 210 → | PRODUCTS | | | |
|---|---|---|---|---|
| | KEY | MODEL # | DESCRIPTION | PRICE |
| 211 → | 1 | 10 - A | BICYCLE | $399 |
| | 2 | 12 - L | TRICYCLE | $159 |
| | 3 | 16 - Q | UNICYCLE | $209 |
| | 4 | 18 - F | TANDEM | $579 |

| 220 → | PARTS | | | | |
|---|---|---|---|---|---|
| | KEY | FKEY | PART # | DESC. | PRICE |
| 221 → | 1 | 1 | 12 | BICYCLE FRAME | $65 |
| | 2 | 1 | 16 | BICYCLE WHEEL | $20 |
| | 3 | 1 | 19 | FRONT BRAKE | $18 |
| | 4 | 2 | 4 | FRONT WHEEL | $32 |
| | 5 | 2 | 13 | SEAT | $50 |
| | 6 | 3 | 36 | POST SEAT | $8 |
| | 7 | 3 | 17 | TIRE | $20 |
| | 8 | 4 | 42 | SEAT | $50 |

```xml
<!? XML>
```
502 —— `<QUERY URL = "HTTP://"WWW.BIKECO.COM/MLE-CGI/XML?BICYCLEPARTS"/>`
504 —— `<RECORD NUMBER = 1>`
506 ——     `<KEY>1</KEY>`
            `<FKEY>1</FKEY>`
            `<PART#>12</PART#>`
            `<DESC>BICYCLE FRAME</DESC>`
            `<PRICE>65</PRICE>`
508 —— `</RECORD>`

`<RECORD NUMBER = 2>`
        `<KEY>2</KEY>`
        `<FKEY>1</FKEY>`
        `<PART#>16</PART#>`
        `<DESC>BICYCLE WHEEL</DESC>`
        `<PRICE>20</PRICE>`

`</RECORD>`

`<RECORD NUMBER = 3>`
        `<KEY>3</KEY>`
        `<FKEY>1</FKEY>`
        `<PART#>19</PART#>`
        `<DESC>FRONT BRAKE</DESC>`
        `<PRICE>18</PRICE>`
510 —— `</XML>`

*FIG. 6*

| INVENTORY ORDERING | | | | | |
|---|---|---|---|---|---|
| SUPPLIER ID | SUPPLIER RECORD # | KEY | SUPPLIER PARTY NUMBER | DESCRIPTION | WHOLESALE PRICE |
| CARCO | 17 | 1 | M-17-Z | 15" WHEEL | $17.50 |
| CARCO | 36 | 2 | M-28-Z | 17" WHEEL | $19.50 |
| TRUCKCO | 4 | 3 | QRL5 | 26" DUAL WHEEL | $39.45 |
| CARCO | 83 | 4 | N-14-F | 15" HUBCAP | $7.75 |
| BIKECO | 2 | 5 | 16 | BYCYCLE WHEEL | $20.00 |
| TRUCKCO | 2 | 5 | ENF8 | 33" SPARE TIRE | $53.05 |
| BIKECO | 4 | 7 | 4 | FRONT WHEEL | $32.00 |
| CARCO | 94 | 8 | L-19-F | LIMITED-SERVICE SPARE TIRE | $8.50 |

| URL | SYSDESCR | LAST POLLED | SYS STATUS | KEY |
|---|---|---|---|---|
| HTTP://WWW.CARCO.COM | DATA ABOUT CAR WHEELS AND TIRES. LOCATED IN ST. LOUIS, MO | 11:04.69 2/23/01 | 1 | 1 |
| HTTP://WWW.TRUCKCO.COM | DATA ABOUT TRUCK WHEELS AND TIRES. LOCATED IN GARY, INDIANA | 11:27.33 2/23/01 | 1 | 2 |
| HTTP://WWW.BIKECO.COM | PRIME CONTACT FOR ALL HUMAN-POWERED VEHICLE WHEELS. LOCATED IN IRVINE, CA | 9:47.17 2/23/01 | 2 | 3 |

FIG. 15

WEB-BASED COLLABORATIVE DATA COLLECTION SYSTEM

RELATED APPLICATION INFORMATION

This application claims the benefit of U.S. Provisional Patent Application No. 60/214,067 filed Jun. 26, 2000 entitled "XML Enabler Agent" and naming Jeff Davison as the sole inventor, which application is incorporated herein by reference, in its entirety, and is referred to herein as "the XML Agent provisional application." This application also claims the benefit of U.S. Provisional Patent Application No. 60/235,458 filed Sep. 26, 2000 entitled "Emily XML Portal" and naming Jeff Davison as the sole inventor, which application is incorporated herein by reference, in its entirety, and is referred to herein as "the XML Portal provisional application."

BACKGROUND OF THE INVENTION

This invention relates to computer systems, and more particularly to a system for gathering data from a server, and storing and processing the data on the client.

With the rise of the Internet and the World-Wide-Web in modern society, many businesses are now taking their transactional business on-line. These businesses are engaging in business to business ("B2B") on-line transactions with other businesses. B2B refers to a wide variety of information exchanges between different independent organizations. For example, B2B can imply transfer of patient records from one hospital to another, or transfer of pricing data to an independent distributor's point of sales system. B2B can also refer to the transfer of sensitive information, such as financial records between different banks.

The term B2B is often used ambiguously. For example, it is not appropriate to refer to B2B in the context of the internal workings of a company. Although internal workflow within an organization may be similar to a B2B system, transactions within the same organizations are easy to direct, since a governing authority can establish policies and protocols. In contrast, B2B systems have no "boss" that can mandate how transactions occur.

Also, B2B is distinctly different from Business to Consumer ("B2C") exchanges. Although both B2B and B2C share common aspects, B2B is motivated primarily by profitability and competitiveness, whereas B2C includes aspects such as glamour and mass appeal. B2B requires a high degree of standardization, while B2C does not.

The problem associated with B2B is clearly illustrated by electronic purchasing of products by companies. This "e-commerce" model of B2B embodies many of the problems and pitfalls associated with B2B in general. In an e-commerce scenario, a business (the "buyer") purchases items from another business (the "supplier"). The information interchange needed to accomplish an e-commerce transaction includes exchange of electronic product catalogs, generation of purchase orders, and confirmation of product delivery.

Consider an exemplary situation where a large organization wishes to make frequent periodic purchases of products. The products are offered from a variety of vendors, all of which are roughly equivalent. Products are distinguished mainly by the price and delivery schedule of each supplier. To make things complicated, the number of suppliers can be large, and the price and delivery times for products can fluctuate.

This situation is exemplified by many real world organizations, such as State and Federal government agencies, and corporations that use competitive buying practices. In the past, this type of purchasing has required laborious combing of vendor catalogs. Even with diligence, such a system often misses the best price and delivery, and encounters discontinued or sold-out products. It is difficult to keep the list of vendors and products up to date.

B2B e-commerce attempts to correct these deficiencies by using machine-readable electronic product catalogs. These electronic catalogs provide real-time information to e-commerce buying programs. This allows product information such as part numbers, product descriptions, and pricing to be available and automatically updated by suppliers.

The formats of the purchase order and product catalog are potential trouble spots for B2B systems. In most cases, the buyer will require the supplier to present its electronic product catalog in a format that can be used by the buyer's client software. This is important when there is more than one supplier, because the client program must compare pricing, delivery, and other parameters between the various suppliers. Also, the buyer will require that the supplier recognizes, and correctly process, purchase orders generated by the buyer's client program. Thus, the overriding difficulty of implementing the B2B e-commerce system is the issue of product catalog and purchase order compatibility. Specifically, the problem lies in obtaining consensus of format and protocol among many dissimilar and autonomous organizations.

It is not workable to impose standards on the B2B process (such as standard catalogs and purchase orders) that radically affect the internal workings of participating organizations. B2B e-commerce systems will work only if they can be inexpensively layered upon the private policies of a company. Any B2B system that attempts to make drastic changes in the internal workings of the organization runs a high risk of being rejected for the simple reason that participants view their carefully crafted internal systems as part of their "competitive edge." Furthermore, although buyers may want e-commerce, suppliers will resist it in the absence of any mandating authority until the cost of e-commerce is compensatory.

SUMMARY OF THE INVENTION

The present invention is directed to a system for gathering data from a web-based server, transmitting the data to a web-based client, and storing the data on the web-based client.

In an aspect of an embodiment of the invention, an enabler agent translates data from a first data model to a second data model using a data mapping function.

In another aspect of an embodiment of the invention, an enabler agent determines which data mapping function to apply by referencing source-identifying information contained within a data request.

In another aspect of an embodiment of the invention, an enabler agent converts data from a structured data format to a markup language format.

In another aspect of an embodiment of the invention, an enabler agent is entirely web-based.

In another aspect of an embodiment of the invention, a data collector periodically polls a list of URLs to obtain updated data from data servers pointed to by the URLs.

In another aspect of an embodiment of the invention, a data collector accesses data stored on a data server using a pre-defined query stored on the server.

In another aspect of an embodiment of the invention, a data collector is entirely web-based.

In another aspect of an embodiment of the invention, a data collector converts data from a markup language format to a structured data format.

In another aspect of an embodiment of the invention, a data collector is a modular component, by using a second enabler agent to access a database associated with a data collector

BRIEF DESCRIPTION OF THE DRAWINGS

The accompanying drawings are included to provide a further understanding of the invention and, together with the detailed description, serve to explain the principles of the invention

FIGS. 2A–2B represent an exemplary data model for a data supplier.

FIG. 6 is a flowchart of a second method for providing data to a data collector, in accordance with an embodiment of the invention.

FIG. 15 is an exemplary URL table, in accordance with an embodiment of the invention.

DETAILED DESCRIPTION OF THE PREFERRED EMBODIMENTS

Before discussing the details of the preferred embodiments, it is useful to provide a brief background on an emerging standard called XML (Extensible Markup Language). XML is similar to HTML (Hypertext Markup Language), which is the language that web pages are written in. However, XML is more flexible than HTML with regard to how tags are named, and how data content can be constructed. Like HTML, XML can be pulled from a web site using HTTP (Hypertext Transport Protocol). XML provides a small advantage to HTML in that it is more readable by programs (although slightly less readable by humans). XML has become a hot topic, mainly because it simplifies the construction of programs that pull data from the web. Also, XML is one of the few standards that provide assistance in the construction of B2B systems.

To implement an e-commerce purchasing system, a simple Server/Client architecture can be established that uses HTTP as the communications protocol, and XML as the underlying data format. The two basic components of such a system are an XML server and an XML client.

The XML server resides at a supplier's site, and allows machine-readable product catalogs to be fetched in real-time by an XML client program at a buyer's site. The server program "advertises" products to potential buyers. The server may also have components to enable online buying of products.

The XML client component resides at a buyer's site, and fetches product catalogs from various XML servers on the network. The client program's job is to scan through the list of suppliers, and determine the best price and delivery options advertised. The client may also be responsible for actually performing a purchase of the products via delivery of an electronic purchase order to the supplier.

These two components form the building blocks of the B2B e-commerce model. XML servers provide product catalogs, which are read by XML clients. XML server programs are HTTP servers that provide XML documents rather than HTML documents. XML client programs are programs that read the XML data, similar to the way web browsers read HTML, but with a special graphical user interface.

Figure 1:
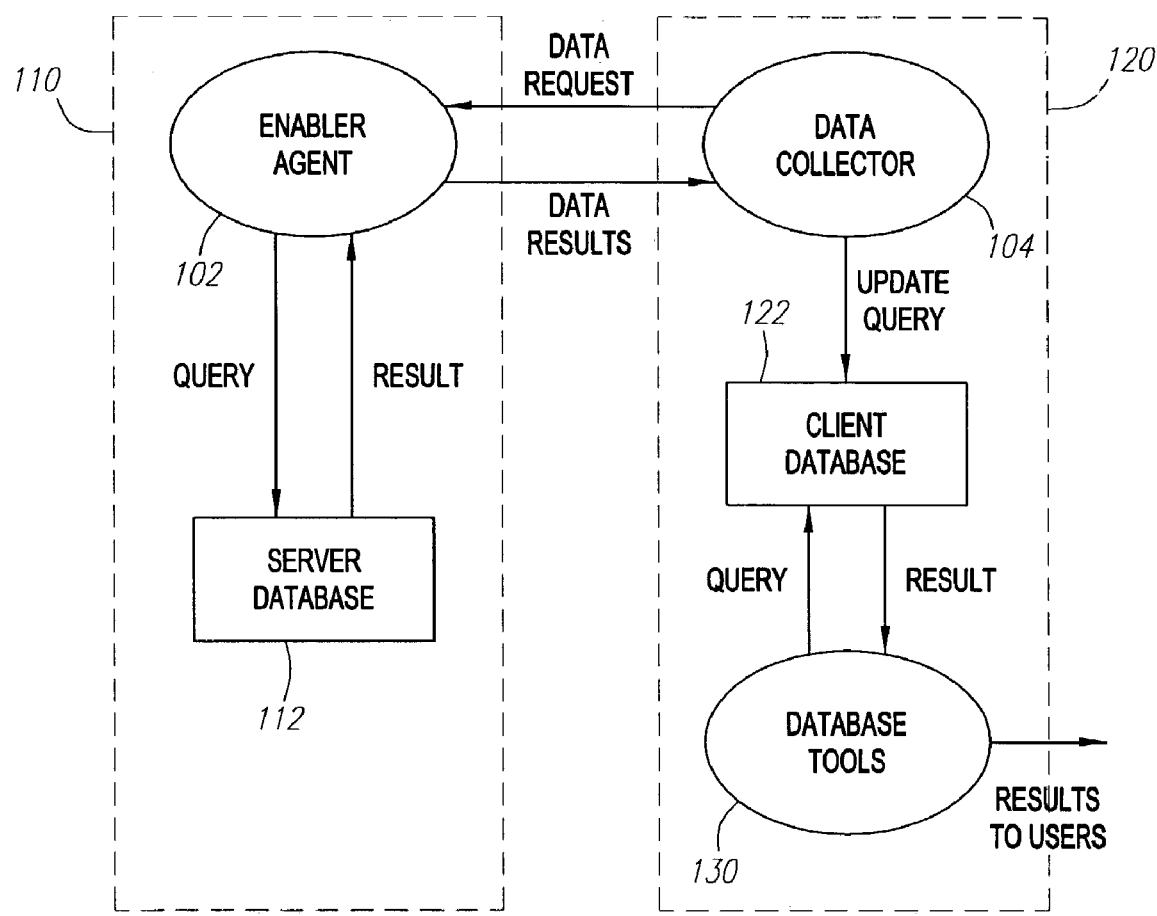
FIG. 1 is a depiction of a client/server relationship in accordance with an embodiment of the invention.

A depiction of the XML server/client relationship is provided in FIG. 1. The supplier's XML server 110 includes a server database 112, which provides electronic product catalog information describing the organization's products, and an enabler agent 102 which processes this data for transmission to the buyer. A data collector 104 on the buyer's XML client 120 receives this information, and stores it in a client database 122. Once the information is received, a database tool 130, such as a purchase order program, on the buyer's client 120 can access the data for various functions, such as initiating purchase orders to the supplier's order processor (not shown).

Although only one XML server and XML client is shown in FIG. 1, each XML client program can have many XML server relationships, and each XML server can have many XML client relationships. Given a situation where the number of buyers is less than the number of suppliers, the number of XML clients for each server will likely be numbered in the hundreds, while the number of XML servers for each client will be numbered in the thousands.

A web-based data communication system in accordance with an embodiment of the invention includes two basic functional units. The first functional unit is an enabler agent 102 that resides on a server, such as the XML server 110 described above. The second functional unit is a data collector 104 that resides on a client, such as the XML client 120 described above. The enabler agent 102 works in tandem with a server database 112, to provide data from the server database in a standard, platform independent format. The data collector 104 works in tandem with a client database 122, to receive data in a standard, platform independent format and store the data in the client database 122. The data communication system works in either a one-to-one, one-to-many, many-to-one or many-to-many environment. Each server communicates data to one or more clients. Each client receives data from one or more servers.

For the sake of simplicity and clarity, this discussion will focus on an implementation of the data collection system in a B2B e-commerce model, as discussed above. The data communication is not limited to e-commerce, however. The system can be generalized to cover many other situations where information needs to be transferred between independent entities. For example, consider how such a system would work in a hospital environment.

The hospital has various enabler agents that furnish access to the databases within the organization. Various specialized clients are provided for specific work groups. The following system might be implemented.

Patient Server. The enabler agent provides patient records for doctors, indicating the current patient health. In general, the enabler agent serves data to those hospital client programs requiring information on patient status.

Doctor Client. The "Doctor Portal" software allows the doctor to place orders for new tests and medication. The orders are similar to purchase orders, however these orders initiate actions by hospital nurses and technicians rather than actions by a supplier's shipping department.

Administrator Client. The "Hospital Administration Portal" allows the patient insurance forms (including tests and medication prescribed by the Doctor) to be submitted to the insurance company.

Insurance Company Server. At each of the various insurance companies used by the hospital and patients, the enabler agent provides insurance information for the hospital, for use by the Administrator Client. This allows the administrator to inspect insurance data and submit insurance claims on line.

The only major changes to the B2B model are in the particular data catalogs (which refer to patients rather than products), and the types of orders initiated by the system (which refer to medical tests and prescriptions rather than purchases.) Otherwise, the system functions much as the B2B e-commerce system described in preceding sections.

Enabler Agent

Referring to FIG. 1, the first component of the data collection system is the enabler agent 102. The enabler agent 102 runs on the server 110, which is controlled by the data supplier. The enabler agent 102 is a web-based application that works in tandem with the server database 112. The server database 112 is a database under the control of the data supplier. The server database 112 stores data in a particular data storage format. Exemplary data storage formats include SQL, flat files of varying format, CORBA databases, XML documents, and HTML documents. In addition to being stored in a particular data storage format, the data is stored in accordance with a particular data model. The details of the data model are determined by the needs and desires of the data supplier, and are not critical to the invention.

FIGS. 2A–2B are an example of how a particular data supplier, in this case a manufacturer of bicycles, would model their data describing bicycle parts. The data model includes a products table 210 and a parts table 220. The data contained within the products table 210 includes a list of all of the fully assembled products that the bicycle manufacturer sells. The products table 210 includes a series of product records 211, which store the data for each product the bicycle manufacturer sells. The products table 210 contains a products key field 212, which uniquely identifies each record in the table. The products key field 212 is used internally to associate the products table 210 with other tables within the server database. The products table 210 also includes a model number field 214, a description field 216, and a price field 218, which contain the various data items which describe each product record in the products table 210.

The data contained within the parts table 220 includes a list of all of the various parts the bicycle manufacturer sells. The parts table 220 includes a series of parts record 221, which store the data for each part the bicycle manufacturer sells. The parts table 220 has a parts key field 222, which uniquely identifies each record in the parts table 220. The parts key field 222 is used internally to associate the parts table 220 with other tables within the server database. The parts table 220 also includes a foreign key field 224, which refers back to the products key field 212 of the products table 210. This field links each parts record 221 in the parts table 220 with a product record 211 in the products table 210. The rest of the parts table 220 comprises a part number field 226, a part description field 228, and a price field 229, each of which contain data describing each part record 221 in the parts table 220.

Returning to FIG. 1, the enabler agent 102 retrieves data from the server database 112 in response to a data request from a user. The user may be a human being, or the user may be a computer process controlled by a human being, or the user may be an automated computer process. In a preferred embodiment, the user is the data collector 104 residing on the client 120.

The request contains information that identifies the data to be retrieved. The request can be transmitted in a variety of ways. In a preferred embodiment, the request is a URL transmitted from the data collector 104. In an alternate embodiment, the request is an electronic mail message. In another alternate embodiment, the request is an application-specific message transmitted by the data collector 104 or by another computer process.

In a preferred embodiment, the request comprises information that identifies a pre-generated database query, the query being stored on the server 110. An exemplary request comprises a URL taking the following form:
http://(hostspec)/mle-cgi/xml?(queryname)

In this URL, (hostspec) is a value that identifies the particular server that the request is directed to. An exemplary (hostspec) value is www.supplier.com. The portion of the URL between the (hostspec) and the (queryname) is information that identifies a particular location on the server where the pre-generated database queries are stored. This information points to, for example, a file or directory containing the pre-generated query.

In this URL, (queryname) is a value that uniquely identifies the particular database query that the request seeks to invoke. The (queryname) value is an arbitrary identifier or keyword that is mapped to a query stored on the server. An exemplary mapping scheme comprises storing each query in a separate file, and referencing the query in the URL by providing the name the file it is stored in the (queryname) section of the URL. For example, the bicycle manufacturer data model discussed above would have queries named "PartsByPrice", which retrieves the entire parts table sorted by price, and "BicycleParts", which retrieves all records in the parts table that correspond to parts used in bicycles.

In this embodiment, an administrator pre-generates a set of database queries and stores those queries on the server. The administrator can use a variety of ways to create these queries. The administrator can manually write the queries. The administrator can also use a query design tool to generate the query in the query language, from a higher level model. The query design tool may be a component associated with the particular database software used to create the server database, or it may be a third-party or stand-alone package. In a preferred embodiment, the administrator uses a web-based editor accompanying the enabler agent software to create the queries.

Once the queries are created, they are stored on the server. In a preferred embodiment, the queries are stored in separate files on the server. This allows the enabler agent to locate the proper query quickly and easily, when the enabler agent is presented with a URL containing the keyword associated with the query, as discussed above. Queries can also be stored in other formats; for example, a single file could contain a library of related queries. The enabler agent in this example would parse the library file to locate the particular query specified in the request.

Figure 3:
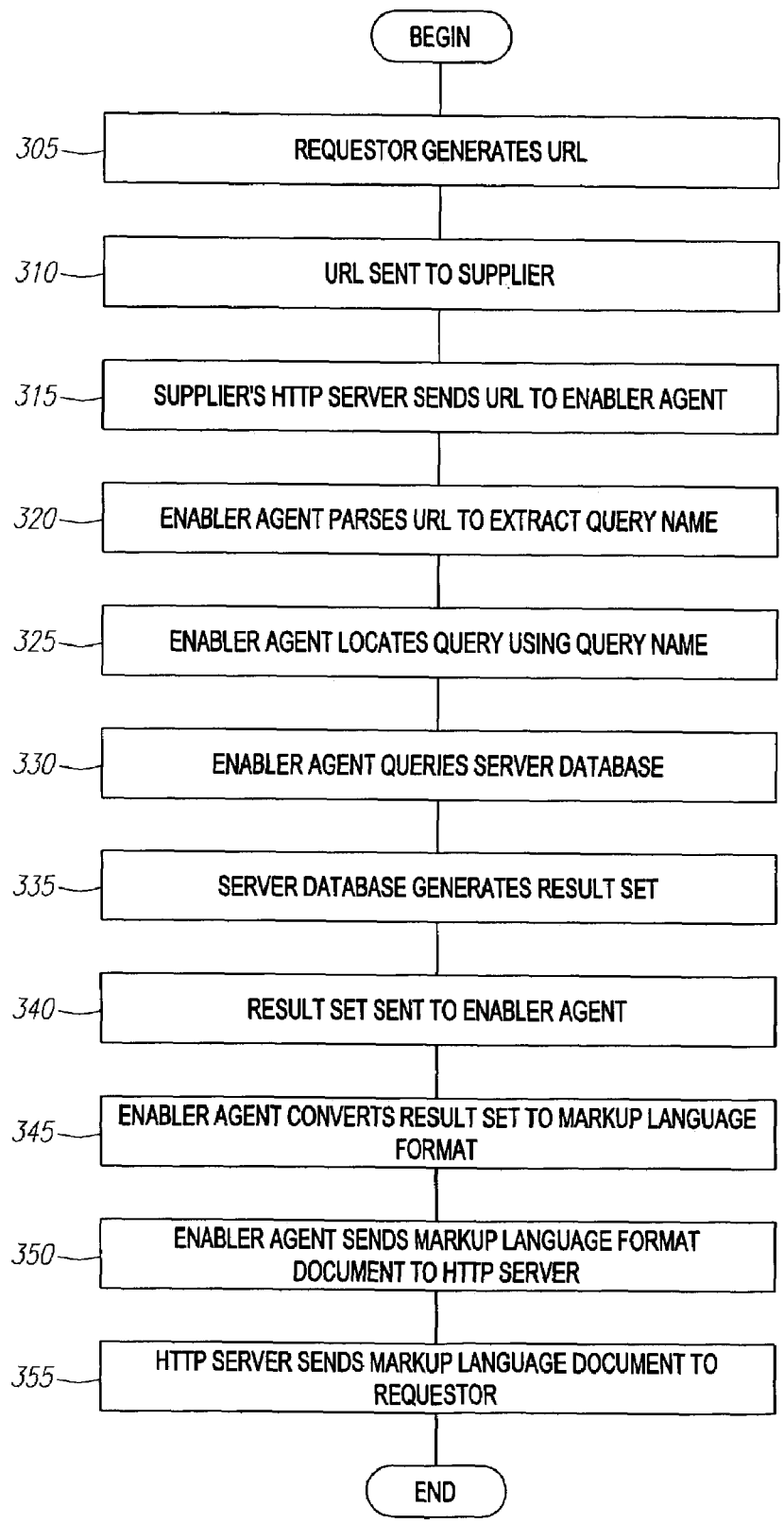
FIG. 3 is a flowchart of a first method for providing data to a data collector, in accordance with an embodiment of the invention.

Turning to FIG. 3, a method for providing data to a data collector in response to a pre-defined query begins at step 305, with a data requestor generating an URL. An HTTP server on the requestor's machine routes the URL over the network to the supplier's server, at step 310. The supplier's HTTP server determines, based upon information contained in the URL, that the URL is a request for the enabler agent, and the URL is routed to the enabler agent at step 315. This routing is a function of the HTTP server, which maps URLs to specific disk files and directories on the server platform. For example, the Apache HTTP server uses an "Alias" directory in the Apache configuration file. The enabler agent parses the URL, at step 320, to extract the query identifier. Using this query identifier, at step 325 the enabler agent locates the query associated with the query identifier, the query being stored on the supplier's server. At step 330, the enabler agent queries the database using the query identified above. The server database generates a result set based on the contents of the query, at step 335. This result set comprises the rows from the various tables of the server database that correspond to the parameters of the query.

The result set is sent back form the server database to the enabler agent, at step 340. At this stage, the result set is still represented in the structured data storage format used by the server database. The enabler agent converts the structured data storage formatted data into markup language data at step 345, and creates a markup language formatted document. The enabler agent then sends this document to the HTTP server at the supplier's site, at step 350. Finally, the supplier's HTTP server routes the markup language document to the requester, at step 355.

In another preferred embodiment, the request comprises a database query generated at the time of the request. An exemplary request in accordance with this embodiment is the following URL:
http://(hostspec)/mle-cgi/xml?post In the above URL, (hostspec) is defined as discussed above. The URL is one way of sending a request to the HTTP server, using an HTTP POST command. This allows arguments contained in an HTML document (using HTML <INPUT> directives) to be sent to the enabler agent. The <INPUT> directive is a standard component of HTML, which allows input by forms to an HTTP server. In an embodiment, the <INPUT> command contains a SQL query, or some other way of directly specifying a request for data, the data to be converted to an XML document. In an alternate embodiment, the arguments are sent to the enabler agent by incorporating them as part of a second URL. For example: http://(hostspec)/mle-ccgi/xml?post?(sqlstatement).

The server uses this additional information to ensure that the query is run properly, and that the requesting user has permission to access the server database. If this information is not provided, the request is processed using default values configured by the administrator of the enabler agent. The administrator may configure the enabler agent using the web-based interface discussed below, or the administrator may manually edit a configuration file.

Figure 4:
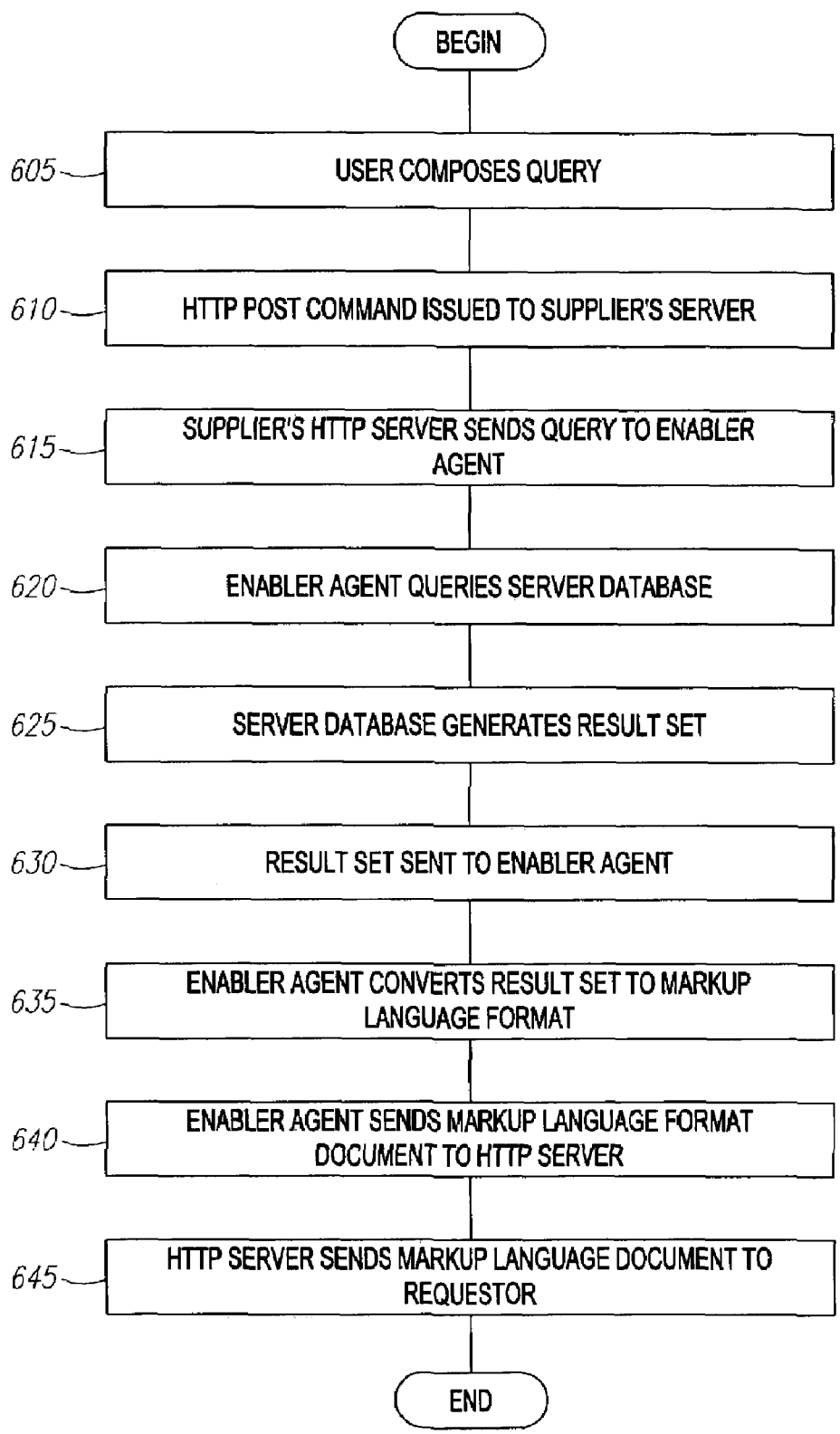
FIG. 4 is a flowchart of a method of converting data from a structured data storage format to a markup language format, in accordance with an embodiment of the invention.

Turning to FIG. 4, a method for retrieving data from a server in response to a user-generated query begins at step 605, with a data requestor composing a query. The query is then submitted to the supplier's HTTP server by sending an HTTP "post" command to the server, at step 610. The post command contains the query and any additional parameters necessary to process the query, such as a user name or a password. The supplier's HTTP server parses the URL and routes the post command to the enabler agent, at step 615. The enabler agent executes a CGI script that extracts the query from the incoming URL, and sends the query to the supplier's database, at step 620. The server database generates a result set based on the contents of the query, at step 625. This result set comprises the rows from the various tables of the server database that correspond to the parameters of the query.

The result set is sent back form the server database to the enabler agent, at step 630. At this stage, the result set is still represented in the structured data storage format used by the server database. The enabler agent converts the structured data storage formatted data into markup language data at step 635, and creates a markup language formatted document. The enabler agent then sends this document to the HTTP server at the supplier's site, at step 640. Finally, the supplier's HTTP server routes the markup language document to the requestor, at step 645.

Figure 5:
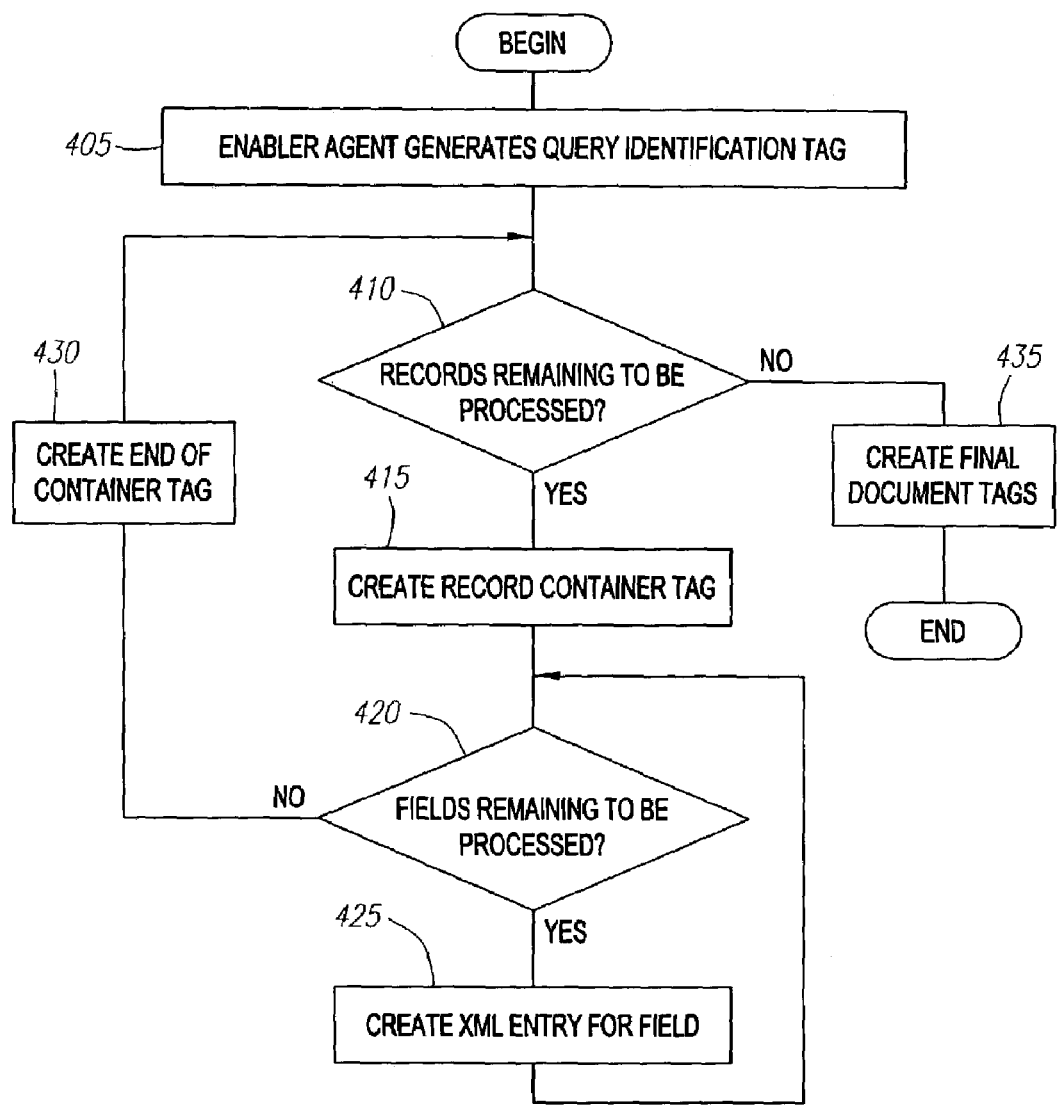
FIG. 5 is an exemplary XML data document constructed using the method of FIG. 4.

In an embodiment where the markup language format is XML, the enabler agent converts the structured data formatted data to XML format using the method of FIG. 5. An exemplary XML document generated by applying this method to a query of the database shown in FIGS. 2A–2B is shown in FIG. 6. The enabler agent receives the result set from the server database, and generates a query identifier tag at step 405. An exemplary query identifier tag 502 is shown for the query "BicycleParts" discussed above. At step 410, the enabler agent examines the result set and obtains the next database record to be processed.

Assuming that records remain to be processed, the enabler agent selects the next record to process, and creates a record container tag for the record, at step 415. The record container tag is assigned a value that uniquely identifies which record of the client database is contained in the query. An exemplary record container tag 504 is shown for the first record in the result set generated by the "BicycleParts" query discussed above. The record container tag 504 has a value of one (1), which corresponds to the value of the key field 222 of the record, as shown in FIGS. 2A–2B.

The enabler agent then parses the fields of the record being processed, at step 420. Assuming that fields remain to be processed, the enabler agent selects the next field to process, and creates a field entry tag for the field, at step 425. By default, the field entry tag is given the name of the corresponding table column matched by the specified query. An administrator using a web-based setup screen can override these default tag names, and the administrator can assign different names. The field value is inserted into the field entry tag, and the field entry tag is then closed. An exemplary field entry tag 506 is shown for the "Key" field of the first record in the result set generated by the "BicycleParts" query discussed above. The field entry tag 506 has a value of one (1), corresponding to the value of the key column 222 of the first record of the parts table 220, as shown in FIGS. 2A–2B.

Once the field entry tag is closed, control passes back to step 420, where the next field is processed. Once all the fields of the first record of the result set have been processed, the enabler agent creates an end of record container tag, at step 340. An exemplary end of record container tag 508 is shown for the first record of the result set for the query "BicycleParts" discussed above. Control then returns to step 410, for processing of the next record in the result set. Once all records in the result set have been processed, at step 435 the final XML tags are created and the XML document is closed. An exemplary closing tag 510 is shown for the result set of the "BicycleParts" query discussed above. Optionally, a data type diagram is also generated for the result set. This data type diagram specifies the type of data being stored in each field of the records of the result set. Table 1 shows an exemplary data type diagram for the "BicycleParts" query.

TABLE 1

| Field Name | Data Type |
|---|---|
| Key | INTEGER |
| Fkey | INTEGER |
| Part # | PCDATA |
| Desc. | PCDATA |
| Price | DOLLAR/NUMERIC |

Using this conversion method, a valid and well-formed XML document is constructed directly from a combination of the field names of the database and configuration data set up by the administrator.

The enabler agent also contains a collection of utility programs to facilitate the setup, operation and debugging of the data collection system. Exemplary utility programs include: a query viewer, to display the results of a query in HTML format; a query editor, to assist an administrator in constructing the pre-defined queries discussed above; a database parameter editor, to allow the user to configure the basic login parameters of the enabler agent, such as the default server name of the server containing the server database, the default login name to supply to a user-generated query, the default password to supply to a user-generated query, and other such parameters; a security parameter program, to assist the administrator in configuring the security parameters of the enabler agent, such as a list of trusted hosts, an authentication mechanism to be used in verifying the identity of users, and a list of the allowed operating modes of the system, which specify whether the enabler agent will accept either pre-defined queries, user-defined queries, or both; and a tag browser program, which provides a simple web-based XML and HTML client that can be used to test the operation of the enabler agent. This list of utility programs is exemplary and not exclusive. Other utility programs can be provided, depending on the particular implementation parameters of a particular embodiment.

Figure 7:
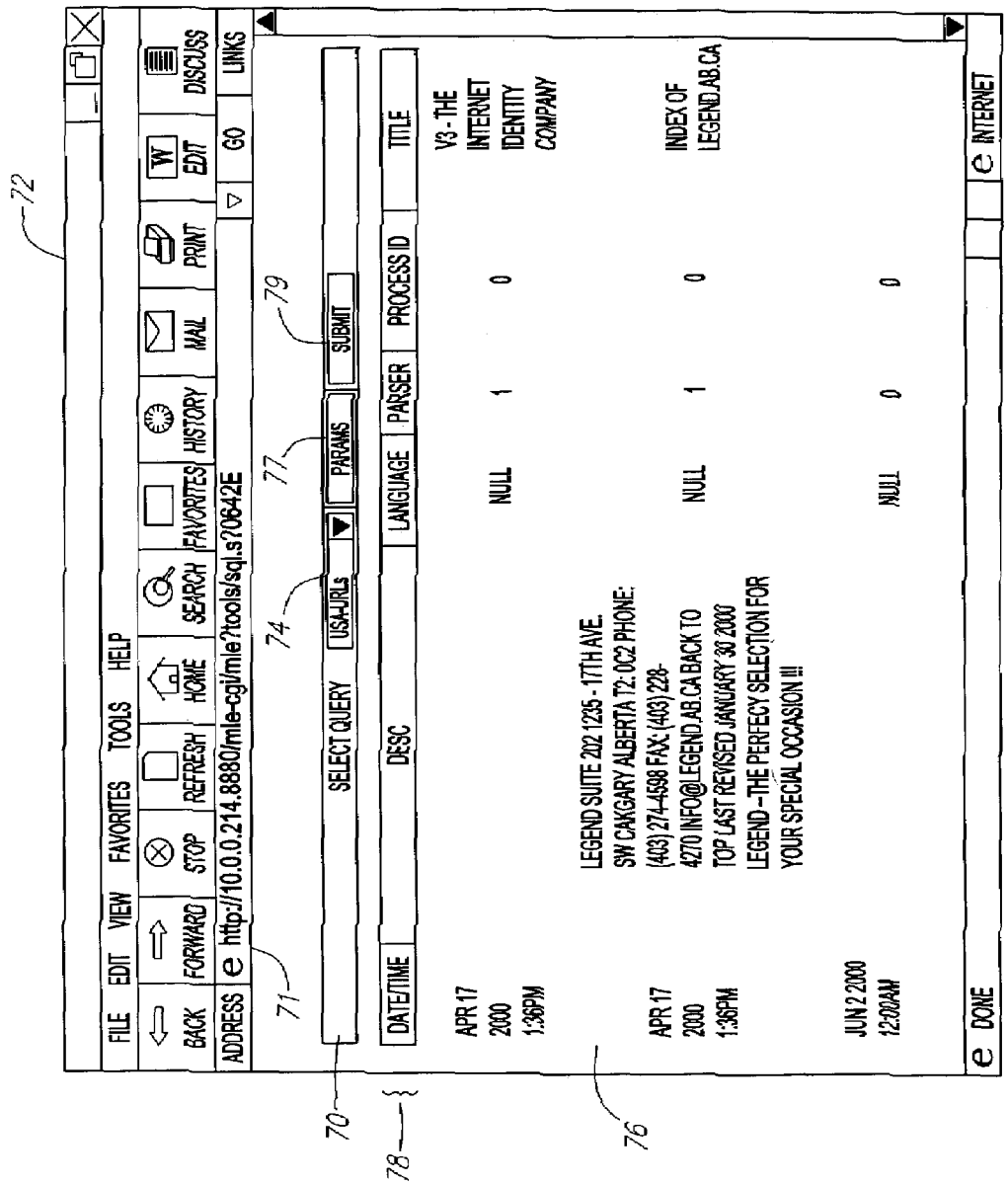
FIG. 7 is a depiction of a query viewer screen, in accordance with an embodiment of the invention.

Turning to FIG. 7, a query viewer screen 70 in accordance with an embodiment of the enabler agent is implemented as a web-based CGI script. The query viewer screen 70 is displayed by activating a first URL 71, inside a web browser program 72. The query viewer screen 70 allows the user to select a particular query to be viewed in HTML format. The screen shows the queried data in a tabular format, and allows the user to select the particular query via a pull-down menu 74. The various queries available to the user are provided in the pull-down menu 74. Queries are constructed via the query editor tool shown in FIG. 8.

The query viewer screen 70 provides a simple way to obtain visibility into a system for debug and analysis purposes. The table 76 displayed by this screen is automatically created from the results of the query. The table 76 is generated from the query results by parsing the query results into components that are formatted into an HTML document that is returned to the user. The top of the table 76 indicates the various fields 78 specified in the query, which also corresponds to the various markup language format tags read by the data collector.

The query viewer screen 70, in addition to providing a view of queried information, also provides the user with a list of the various queries created by the query editor screen from the pull-down menu 74. Additionally, database parameters are configurable for the query by activating a button 77 that calls up a query parameter screen. A button 79, when activated, submits the query to the database.

A user of the query viewer screen 70 views a particular query by: (1) selecting the query from the pull-down menu 74, (2) providing any required database parameters by activating the button 77 and entering the values into the form that pops up, and then (3) activating the button 79, thus submitting the query to the database. The query results are returned, automatically converted into HTML format, and displayed in the query viewer screen 70.

Figure 8:
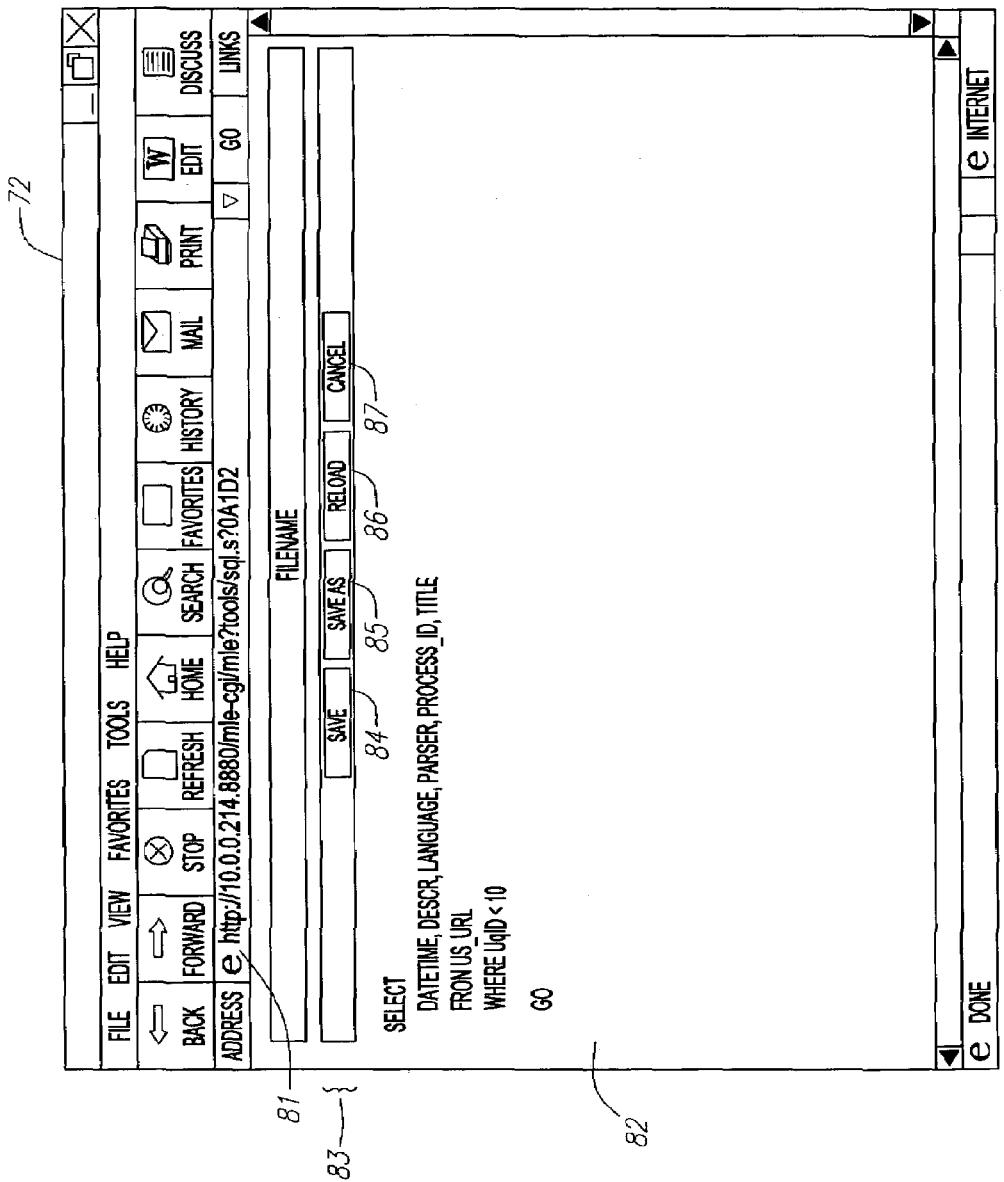
FIG. 8 is a depiction of a query editor screen, in accordance with an embodiment of the invention.

Turning to FIG. 8, a query editor screen 80 in accordance with an embodiment of the enabler agent is implemented as a web-based CGI script. The query editor screen 80 is displayed inside the web browser 72, by activating a second URL 81. The query editor screen 80 allows the user to compose queries that are associated with particular items in the pull-down menu 74 of the query viewer screen 70 (of FIG. 7). The query editor screen 80 allows the user to create, modify, or delete queries, and associate these queries with items in the pull-down menu 74 of the query viewer screen 70 (of FIG. 7).

The query editor screen 80 contains a text window 82 where the user can enter the query, in a structured data storage format, such as SQL. The query editor screen 80 also contains a palette of buttons 83 that provide functionality to the screen 80. These buttons include; a save button 84, which when activated cause the contents of the text window 82 to be saved to long-term storage; a save as button 85, which when activated causes the user to be prompted to enter an identifier to be associated with the contents of the text window 82, and then saves the contents into long-term storage; a reload button 86, which when activated causes the user to be prompted for a query identifier, and then retrieves the query associated with the query identifier and displays it on the text window 82; and finally a cancel button 87, which when cancels any operation in progress. For example, if the user activates a long query, and then wishes to halt operation of the query, the user clicks the cancel button 87. These are exemplary members of the button palette 83. Depending upon the particular functionality desired, other buttons could be included in the button palette 83.

The query editor screen 80 facilitates associations of queries (which are not visible to clients or unprivileged users) and the query results. Each query resides in its own file on the server. The files can be modified by the query editor screen 80, or by a standard text file editor.

Figure 9:
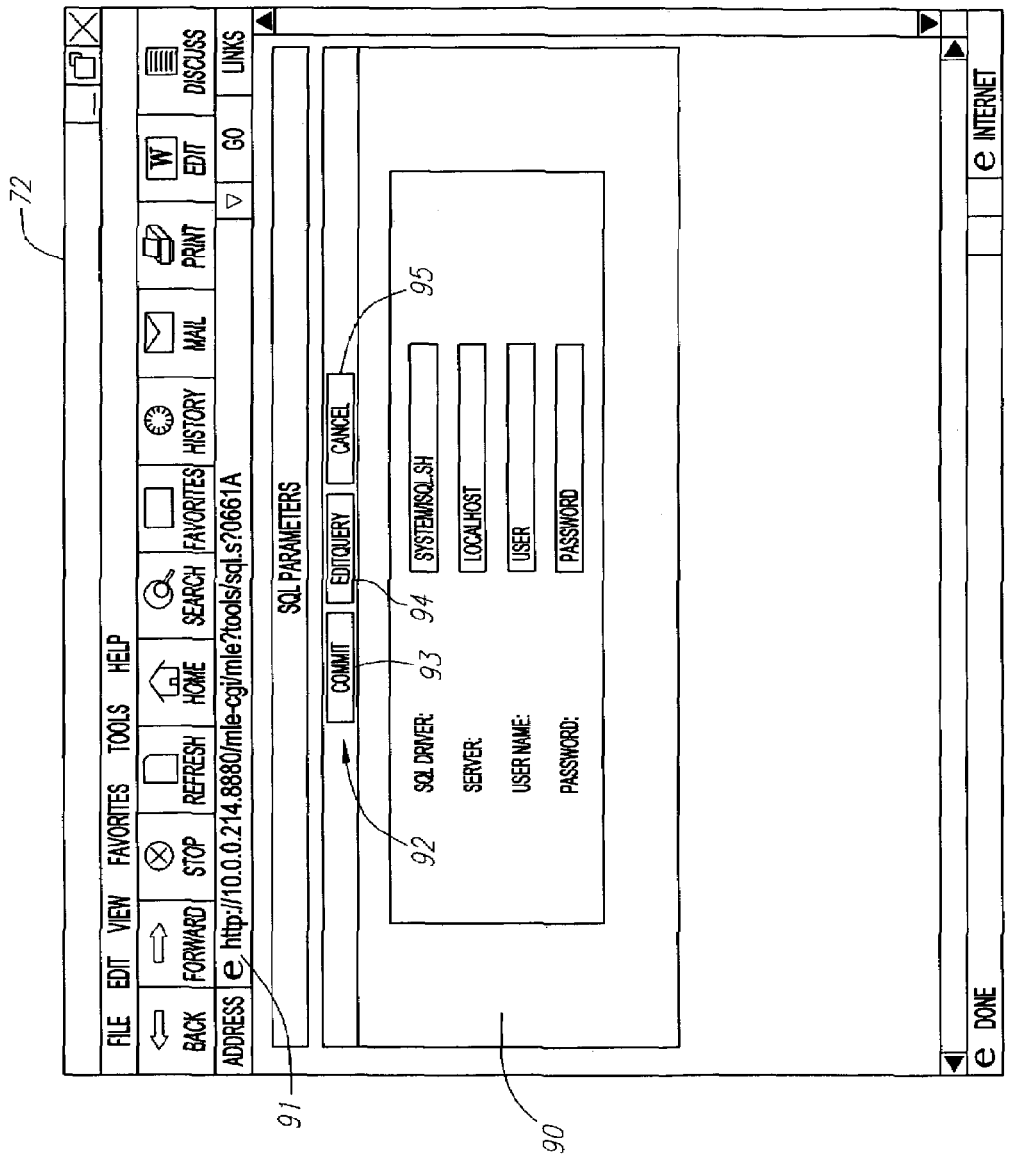
FIG. 9 is a depiction of a parameter editor screen, in accordance with an embodiment of the invention.

Turning to FIG. 9, a database parameter screen 90 in accordance with an embodiment of the enabler agent is implemented as a web-based CGI script. The database parameter screen 90 is displayed inside the web browser 72, by activating a third URL 91. The database parameter screen 90 provides general utility in configuring the various parameters of the system. This screen provides a central place for specifying values needed to make queries, such as driver programs, time-outs, passwords, and security items. This screen also allows easy modification of an existing mapping of a query to a data source. This screen will typically be available to privileged users.

The database parameter screen 90 has text boxes 92, where a user enters the necessary parameters for the database. The particular parameters to be used are dependent upon the specific database package chosen by the creator of the data collection system.

The database parameter screen 90 also has a button palette 92, which provides functionality to the screen. These buttons include: a commit button 93 that when activated causes the changes made by the user to be stored to the database; an edit query button 94 that when activated pops up a window containing the query, and allowing the query to be edited; and a cancel button 95 that when activated closes the database parameter screen 90 without making any changes. These are exemplary members of the button palette 92. Other buttons can be used in the button palette 92, depending on the particular functionality desired.

The enabler agent is intended to be a comprehensive system containing various support tools and facilities. Exemplary support tools include: an embedded HTTP server, to allow users to run the enabler agent without needing a third-party HTTP server; database insert and update utilities, which allow privileged users to insert and update tables on the server database and provide a programmatic interface to allow a table to be loaded by external software, such as the Emily Framework language discussed below, or an HTTP client; the Emily Framework scripting language and development kit, to allow users to create new functionality and capabilities for the system; and online documentation in the form of markup language documents and PDF files, the documentation being sufficient to install, configure, operate and maintain the system.

Emily Framework Scripting Language

Figure 12:
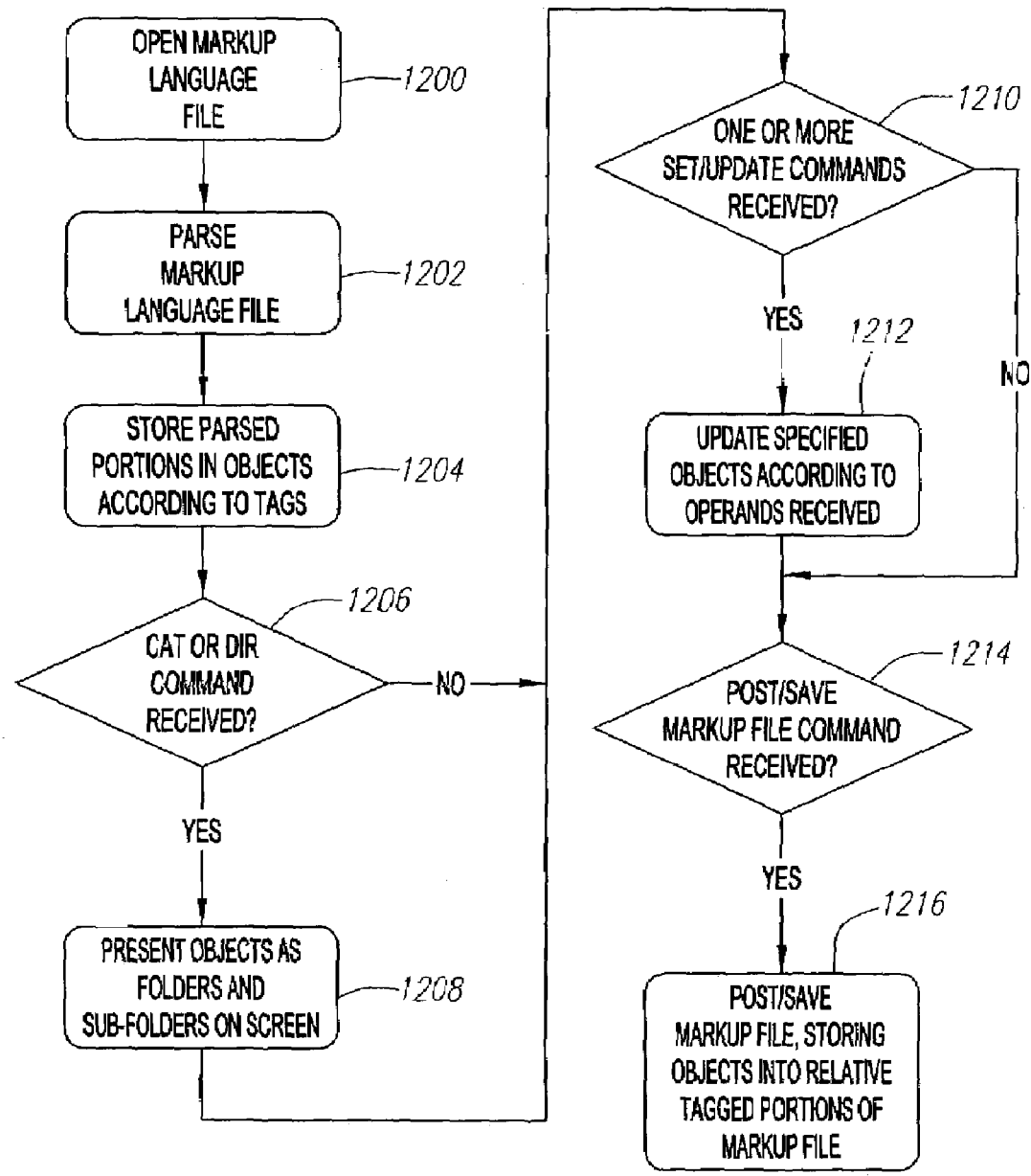
FIG. 12 is a flowchart of a method of parsing data using the optional Emily Scripting Language of an embodiment of the invention.

With reference to FIG. 12, a flow diagram illustrating a typical method performed by the optional Emily scripting language is shown. The Emily scripting language may be used for processing a markup language file having one or more tagged portions. The method comprises opening a first markup language file, step 1200, and parsing the first markup language file for one or more portions, step 1210. The language interpreter then stores each portion of the first markup language file into one or more objects in an electronic memory, at step 1202.

Part of the Emily language may include a CAT or DIR command. If such a command is received by the language interpreter, step 1206, then the interpreter causes the one or more objects to be presented for selection, viewing or other processing in one more corresponding folders and sub-folders on-screen, step 1208. The one or more folders may be presented in a hierarchical list having sub-folders according to an arrangement of sub-portions of the first markup language file, each sub-folder representing an arrangement, sub-arrangement, or object containing a portion of the first markup language file.

The Emily language comprises a command language set allowing selection, viewing and other processing of the one or more objects. The command language set comprises a plurality of commands for selection, viewing and other processing. A subset of commands may comprise one or more commands for processing one or more folders, sub-folders, portions, or sub-portions of the first markup language file, the subset comprising one or more executable batch files containing a subset of the set of commands. One or more executable batch files may be included within a second markup language file, the subset of commands in the executable batch file comprising commands for including one or more of the objects containing portions of the first markup language file in the second markup language file.

The language interpreter may receive one or more SET or UPDATE commands for setting or updating objects in the first or second markup language file, step 1210. If such a command is received, the language interpreter updates the objects in memory according to the commands received, step 1212.

If a POST or SAVE command is received, step 1214, the following steps may be performed as part of said other processing for updating the respective markup language file, step 1216: receiving a subset of commands comprising one or more commands, said one or more commands comprising instructions for updating one or more objects based on the received one or more commands; updating the one or more portions contained in the one or more objects according to the received one or more commands; and saving the portions contained within the one or more objects to the first respective language file that have been updated.

Alternatively, the following steps may be performed as part of said other processing for providing a second markup language file to a network node identified by a uniform resource locator: receiving a subset of commands comprising one or more commands, said one or more commands comprising instructions for updating one or more objects based on the received one or more commands; updating the one or more portions contained in the one or more objects according to the received one or more commands; and providing the second markup language file to the network node identified by the uniform resource locator.

Alternatively, the first markup language file may comprise one or more portions receptive to data input, wherein said other processing comprises receiving and sending said data input by performing the steps of: receiving said data input, storing said data input into in said objects containing said one or more portions receptive to data input; and posting said data input to said markup language file. At least a portion of the data input may then be processed after the step of receiving and before the step of storing. This alternative processing may be used, for example, to receive SQL commands for performing a query on a remote database, or posting to a remote database.

Data Collector

Returning to FIG. 1, the second functional unit of the B2B system is the data collector 104. The data collector 104 is a computer program that runs on a server 120 controlled by the buyer. The data collector 104 works in tandem with a client database 122 under the control of the buyer. The client database stores data in a particular data storage format. Exemplary data storage formats include SQL, flat files of varying format, CORBA databases, XML documents, and HTML documents. In addition to being stored in a particular data storage format, the data is stored in accordance with a proprietary data model, determined by the needs and desires of the buyer. This proprietary data model is typically different from the proprietary data model used by the supplier, as discussed above. The client database 122 is also associated with a suite of database tools 130, used to manipulate the data stored in the client database 122, and to provide the data to users.

Figures 13, 14:
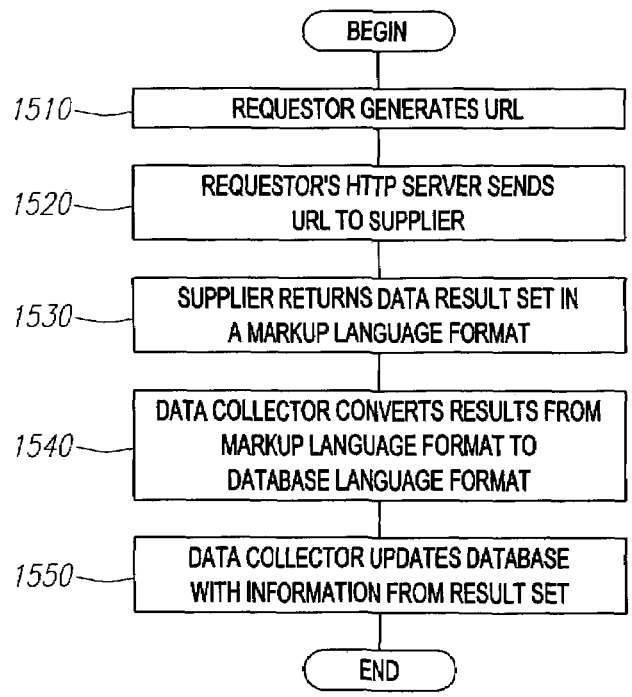
FIG. 13 is an exemplary data model for a buyer, in accordance with an embodiment of the invention.
FIG. 14 is a flowchart of a method for collecting data, in accordance with an embodiment of the invention.

FIG. 13 is an example of how a particular buyer, in this case a distributor of wheels, would model the data describing its inventory. The data is stored in a table 1400. The wheel distributor orders products from many different suppliers, so it has created a supplier ID column 1410, which contains information identifying the source of the product. In order to properly link the records stored in the buyer's database with the catalog data coming from the supplier, a supplier record number field 1420 is provided. The key field 1430 is a locally maintained field that uniquely identifies each record in the buyer's database. The supplier part number field 1440 contains information from the supplier that is used by the supplier to uniquely identify the part. Note that this value can also be used as the linking value between the supplier-provided data and the buyer's database, instead of using the supplier record number field 1420.

The description field 1450 and wholesale price field 1460 contain additional information about the catalog items stored in the buyer's database. In this example, the fields 1420, 1440, 1450, and 1460 all contain data downloaded from the supplier's database. The supplier ID field 1410 is populated with the name of the supplier. This value can be downloaded from the supplier, or it can be supplied locally by the buyer, as will be discussed below. The values for the key field 1430 are determined locally. The exemplary buyer of FIG. 14 has loaded its inventory ordering table 1400 with data from three suppliers, Car Co., Truck Co., and Bike Co., the supplier discussed above.

Returning to FIG. 1, the data collector 104 transmits a data request to the server 110, receives a response from the server 110, the response containing the requested data, and stores the requested data in the client database 122.

The data request can be transmitted in a variety of ways. In a preferred embodiment, the data request is an URL transmitted by the data collector 104 to the server 110. In alternate embodiments, the data request is an e-mail message sent to the server 110 or an application-specific message sent to the server 110 by the data collector or another computer process. In another alternate embodiment, the server 110 initiates the data request, and the results are pushed across the network to the data collector 104.

The data request contains information that identifies the data to be retrieved. In a preferred embodiment, the request comprises information that identifies a pre-generated database query, the query being stored on the server 110. The details of the pre-defined queries of this embodiment are discussed above in the enabler agent section. In another preferred embodiment, the request comprises a database query generated at the time of the request. Details of the request of this embodiment are also discussed above in the enabler agent section.

Turning to FIG. 14, a method for retrieving data from a data server begins at step 1510, with a data requestor generating a URL. An HTTP server on the client routes the URL over the network to the supplier's server, at step 1520. The supplier returns a data result set in response to the data request, at step 1530. This result set is returned in a markup language format. The data collector receives the markup language formatted result set from the server, and converts the result set into the particular structured database format used by the client database, at step 1540. The final step comprises the data collector updating the client database with the information from the result set, at step 1550.

The data collector can generate the URL of step 1510 in several different ways. The data collector in a preferred embodiment contains a listing of URLs of the various suppliers that the data collector communicates with. Alternatively, the data collector prompts a user to provide a URL. In an embodiment where the server pushes the result set to the client without needing a request from the client, steps 1510 and 1520 of the method of FIG. 14 are omitted.

In an embodiment where the data collector maintains a list of URLs of suppliers, a scheduling system is used to automatically provide URLs for querying supplier databases. The list of URLs is maintained in a database table, containing a series of records, one for each URL to be queried. An exemplary URL storage table is shown in FIG. 15.

The URL column 1610 contains the URL of the server to be polled by the data collector. The Sys Descr column 1620 contains optional additional information about the server. The Last Polled column 1630 contains the date and time the server was last polled for new data. The Sys Status column 1640 contains a status code indicating the status of the data server as of the last polled time. In this example, the allowable status codes are listed in Table 2.

TABLE 2

| Code | Name | Description |
| --- | --- | --- |
| 1 | Online | Server functioning normally |
| 2 | Offline | Server not accessible |
| 3 | Disabled | Polling for this server is disabled |
| 4 | HTTP Error | HTTP error reported by HTTP server |
| 5 | XML Error | XML error reported by HTTP server |
| 6 | Other Error | Misc. errors reported |

The key field 1650 is a unique identifier used to link records to other data in the client system, such as expanded supplier-related data. The values typically increase monotonically from one.

Once a URL data table is created, the table is populated with URLs that the buyer wishes to automatically poll for data. The user can either supply the URL directly to the table, or preferably the user uses a web-based form or CGI screen to enter the URL into the URL table.

Once the URL data table has been populated with at least one URL, a polling schedule is created. This schedule minimally determines the rate at which URLs are polled for new data. The polling schedule can also be used to perform other periodic actions such as executing external programs. The polling schedule is set up by the administrator of the data collector based upon the particular needs of the buyer. This setup is preferably done using a web-based CGI screen.

Once the polling schedule is defined, the actual URL polling is done. An automated process is periodically triggered by the polling schedule, based upon the parameters defined by the administrator. The polling function steps through the list of URLs stored in the URL table, and transmits the URLs to the HTTP server on the client, thus generating the URL as specified in step 1510 of FIG. 14.

Figure 16:
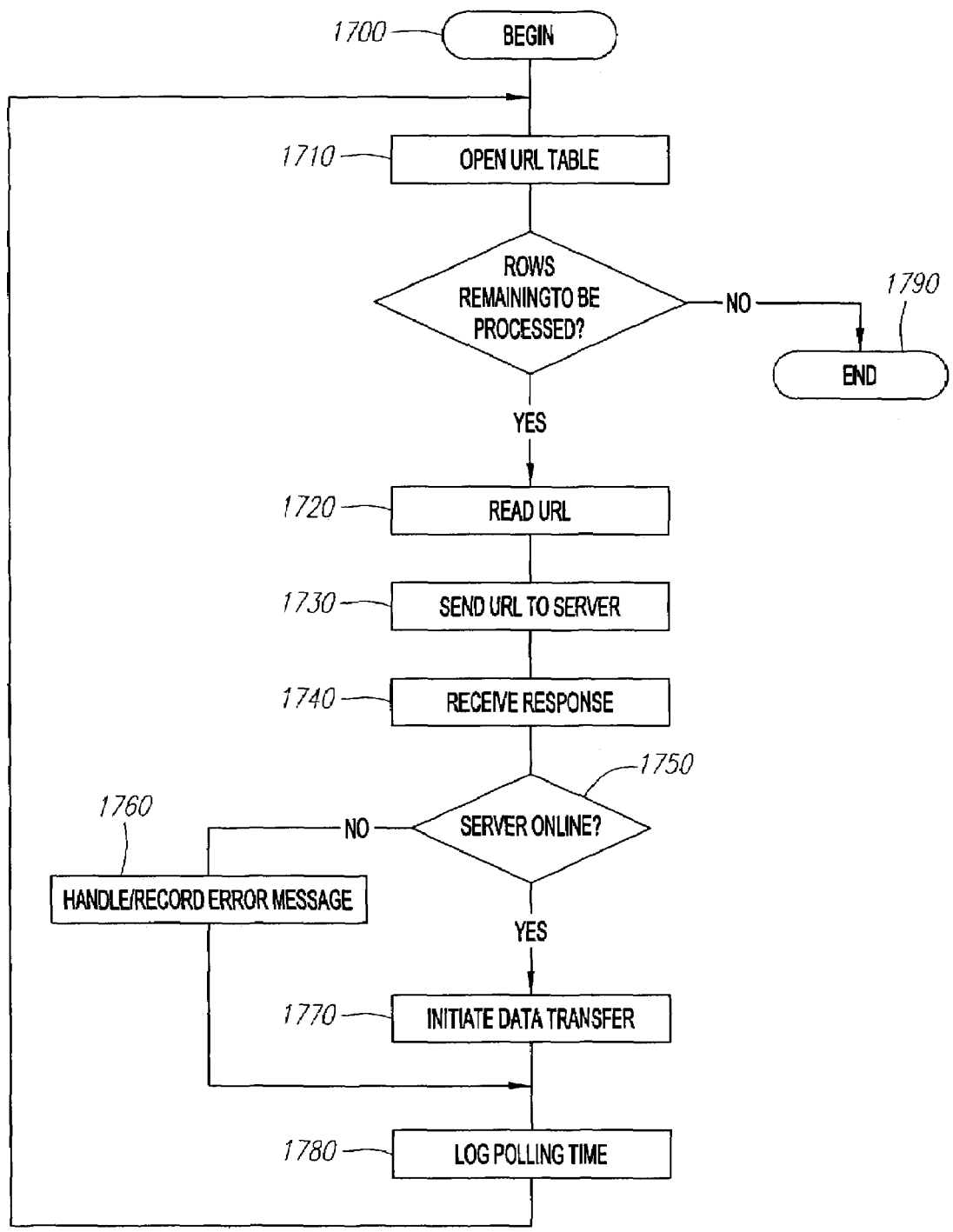
FIG. 16 is a flowchart of a method for polling data sources, in accordance with an embodiment of the invention.

A method of polling the servers identified by the URLs in the URL list is shown in FIG. 16. The method commences at step 1700, when the data collector opens the URL table. The data collector typically opens the URL table in response to a command from the polling schedule. Alternatively, the data collector can open the URL table in response to a command from a user, or from another process running on the client.

Once the URL table is opened the poller steps through the entries in the URL table. At step 1710, a check is made to see if any rows remain to be processed. If all the URLs have been polled, the method exits at step 1790.

Assuming that there are still URLs to be polled, the method proceeds to step 1720, where the URL value is read from the current row of the URL table. At step 1730, this value is routed to the HTTP server on the client, then over the network, and then to the HTTP server at the supplier. Depending on the status of the supplier's server, one of the different responses, shown in Table 2, is received back from the server, at step 1740. A check is made at step 1750, to verify that the server is on-line and the data is available for transmission. If the check is successful, then at step 1770 the data transfer is initiated. If the check fails, then at step 1760 the reason for failure is recorded in the URL table.

Once the data transfer is initiated, or where the server is unavailable and an error is returned, the poller then records the polling time, at step 1780. The method then returns to step 1710, for processing of the next row. The HTTP server residing on the client handles the actual data transfers. Methods of transferring data using HTTP servers are well known to those skilled in the art and are not critical to the invention.

As the data collector polls the various data suppliers it is collecting data from, a collection of incoming data documents is created. The data collector converts the incoming data documents from the markup language format they are transmitted in into the structured data storage format used by the client database. This conversion, noted as step 1540 of FIG. 14, follows the method shown in FIG. 17, as applied to the exemplary XML data file of FIG. 6.

Figure 17:
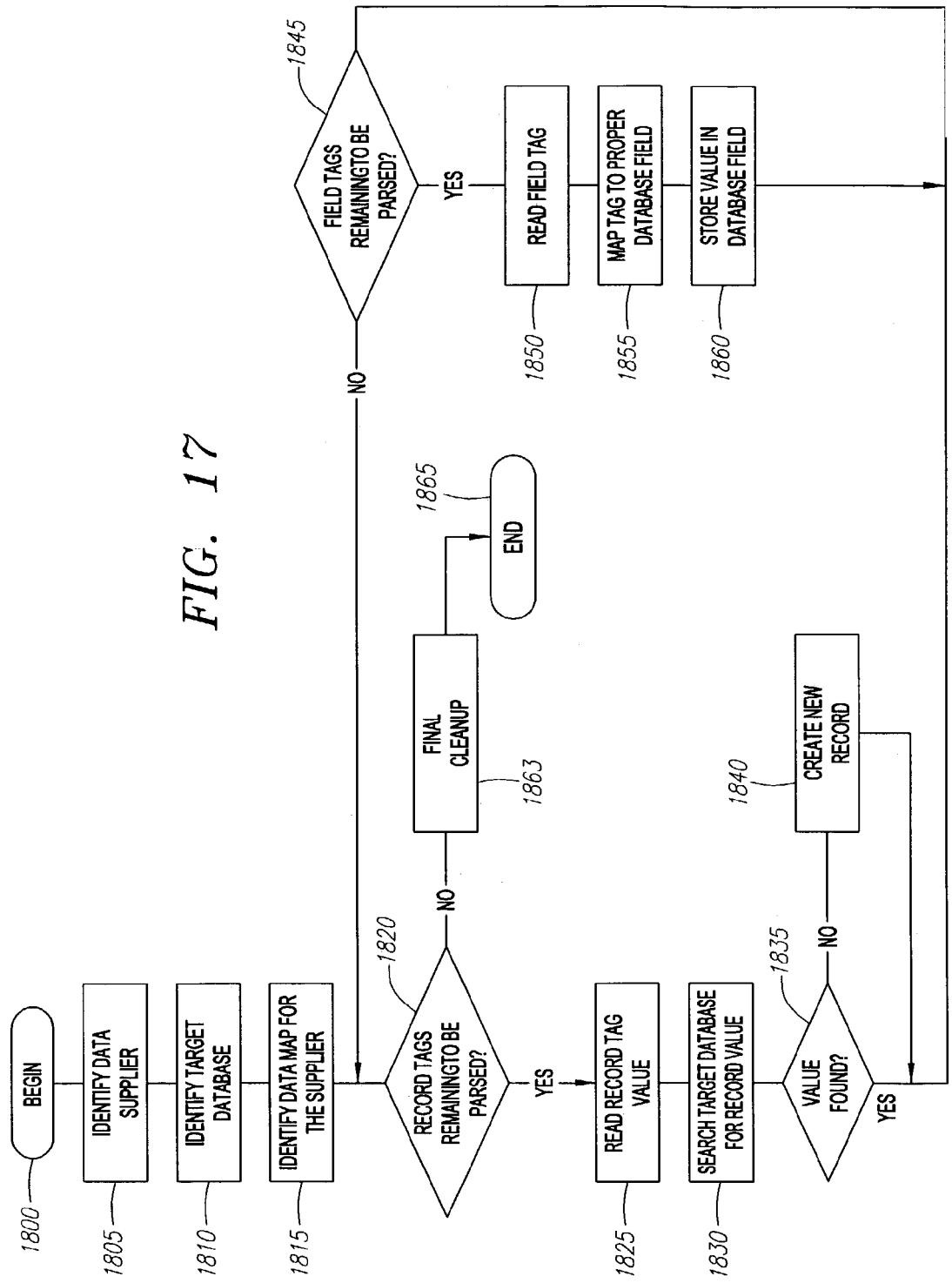
FIG. 17 is a flowchart of a method for a method of converting data from a markup language format into a structured data storage format.

The data conversion method of FIG. 17 begins at step 1800, where the data collector receives the XML data file. At step 1805, the data collector parses the query row 502 and identifies the data supplier for the data document. At step 1810, the data collector determines the proper target database for the data contained in the incoming document. Where there are multiple possible targets, the data collector determines which table to store the data in by, for example, checking the value contained in the query row 502 against values stored in a URL table stored on the client.

At step 1815, the data collector identifies the data map to use in associating the contents of the various XML tags with the corresponding database items. Depending on the particular requirements of the implementation, this data map can be a simple correlation of field tags to database fields, or it can be a complex mapping of record tags to records in one table or many different tables within a large multi-table relational database system. In simpler systems, the data map is omitted, and the various tags are directly mapped to database items bearing the same name. If data type information is provided in the XML document, this information is also parsed and stored for future use. Data type information would typically be used where a new table is being created to store incoming data.

Once the initial setup information has been processed, the data collector then steps through the file, unpacking the records and fields stored in the file. At step 1820, a check is made to see if any records remain to be converted. If all records have been converted, the method proceeds to step 1863, where any necessary final cleanup is done, such as deleting from the client database records that no longer appear in the XML data document, closing database tables, storing backup copies of files, etc. The method then terminates at step 1865.

Assuming that there are records remaining to be processed, at step 1825, the current record identifier is read by the data collector. The data map is also checked at this step, to see if there is a mapping defined for this tag. The proper target database item is then searched, at step 1830, for the record corresponding to the current record tag. A check is made at step 1835 to see if a corresponding record was found. If no record corresponds to the current record tag, then at step 1840 the data collector issues a command to the database instructing the database to create a new record for storing the current record tag.

Once the new record is created, or if the corresponding record was found, then the collection of field tags associated with the current record tag is parsed. At step 1845, a check is made to see if any field tags remain to be parsed. If all field tags associated with the record have been parsed, control passes back to step 1820, where the next record is processed. Assuming there are fields remaining to be parsed, at step 1850 the field tag is read by the data collector. At step 1855, the data collector maps the field tag in the XML data document to the proper field in the database record. Where a data map is available, the data collector applies the mapping defined in the data map to make the like between the field tag and the database field. Otherwise, the data collector will default to linking the field tag to the database field bearing the same name as the field tag. Once the proper field has been identified, at step 1860 the field tag value is written to the database field. Control then passes back to step 1845, where the next field tag is processed.

Additional functionality can also be incorporated into the data collector. For example, in an embodiment the data collector has an alarm system. This alarm system triggers an alarm when the content of a database item changes. The administrator can set up an alarm that is triggered when, for example, the value of the price field for a record changes, or a new record is added to the database. Referring to FIG. 17, the alarm system is invoked either at step 1840 when a new record is created, at step 1860 when a field value is stored, assuming the newly stored value is not the same as the old value, and/or at step 1803 when obsolete data is deleted from the system.

The alarm system interacts with an action and notification system. The action and notification system allows the administrator to define one or more actions that are performed when a particular alarm is triggered. For example, when a new record is added to the database, an e-mail message is sent to selected users in the buyer's organization, advising them of the newly available goods. Other actions include running an external program, performing an HTTP post operation, or running an Emily or third-party script.

The data collector also contains a collection of utility programs to facilitate the setup and operate of the data collector. In a preferred embodiment, these programs are implemented as web-based CGI scripts. Exemplary utility programs include screens which allow a user to: specify URLs to be polled, define a data map for data from a particular URL, set up alarms for the various data items stored in the client database, set up notifications that will be triggered by the alarms, set up system login accounts for other users of the data collection system, and perform other activities needed to configure and maintain the data collector. Other setup and configuration screens can also be provided, depending on the particular requirements of a given embodiment.

In addition to the administrative tools described above, the data collection system optionally includes a suite of database manipulation tools. In an embodiment, these tools include: a web-based search engine, whereby a user can search the database by running a pre-defined query on the client database; a web-based screen creator, whereby a user can make simple markup language screens that display data from the client database; a script editor, whereby a user can create scripts in a scripting language, to execute more complex operations on the database or to create dynamic screens; and/or a form creator, whereby a user can create markup language forms for updating the client database or for posting client database items to other HTTP servers. These tools can be provided as part of the data collection system, or they can be third-party application programs provided by the user. Exemplary third-party application programs include ASP, Cold Fusion, or ISQL. The particular database manipulation tools chosen are design choices for those skilled in the art and are not critical to the invention.

In an embodiment, the data collector also includes security features, to limit usage to authorized personnel and to safeguard the database. These features include an administrative/security console program. This console program is preferably a non-web-based application that is only available to selected administrative personnel. For example, the console program could be program maintained only on a special machine, or located in a protected directory on the client machine. The console program may also be a web-based screen or series of screens.

The console program allows administrators to set passwords and permissions on the various screens of the data collector and associated toolkits, as well as on any embedded HTTP server. The console program permits the administrator to use HTTP authentication, securing any screen or directory associated with the data collector with a pop-up login interface. The console program also includes a utility to set up and maintain a trusted host list (by IP address or by network). The trusted host list is a list of host machines that are allowed to access various files and screens within the client.

System Architecture Overview

Figure 10:
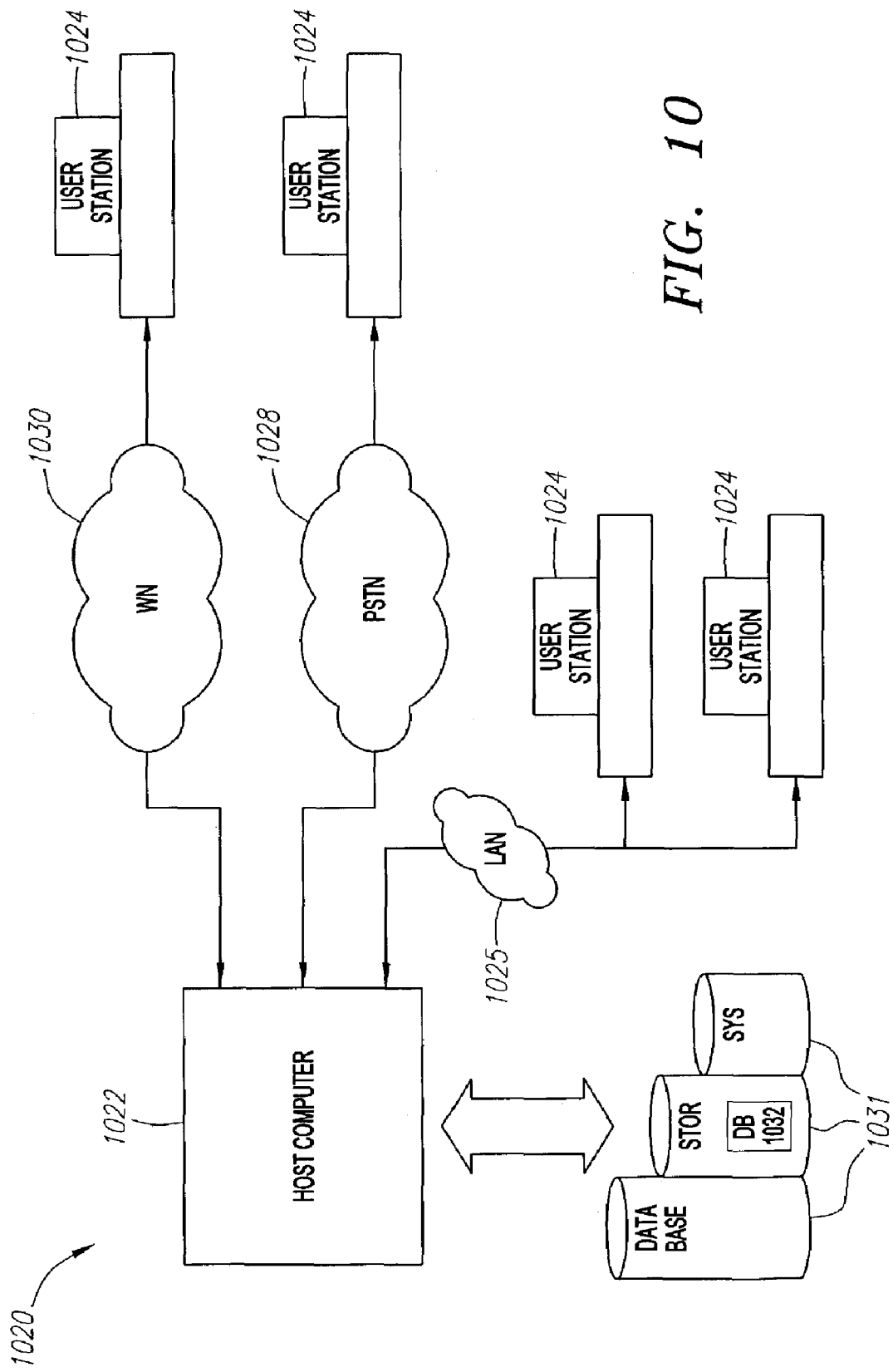
FIG. 10 is a representation of a computer system in accordance with an embodiment of the invention.

Referring to FIG. 10, in an embodiment, a computer system 1020 includes a host computer 1022 connected to a plurality of individual user stations 1024. In an embodiment, the user stations 1024 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1024 are connected to the host computer 1022 via a local area network ("LAN") 1025. Other user stations 1024 are remotely connected to the host computer 1022 via a public telephone switched network ("PSTN") 1028 and/or a wireless network 1030.

In an embodiment, the host computer 1022 operates in conjunction with a data storage system 1031, wherein the data storage system 1031 contains a database 1032 that is readily accessible by the host computer 1022.

In alternative embodiments, the database 1032 may be resident on the host computer, stored, e.g., in the host computer's ROM, PROM, EPROM, or any other memory chip, and/or its hard disk. In yet alternative embodiments, the database 1032 may be read by the host computer 1022 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 1022 can access two or more databases 1032, stored in a variety of mediums, as previously discussed.

Figure 11:
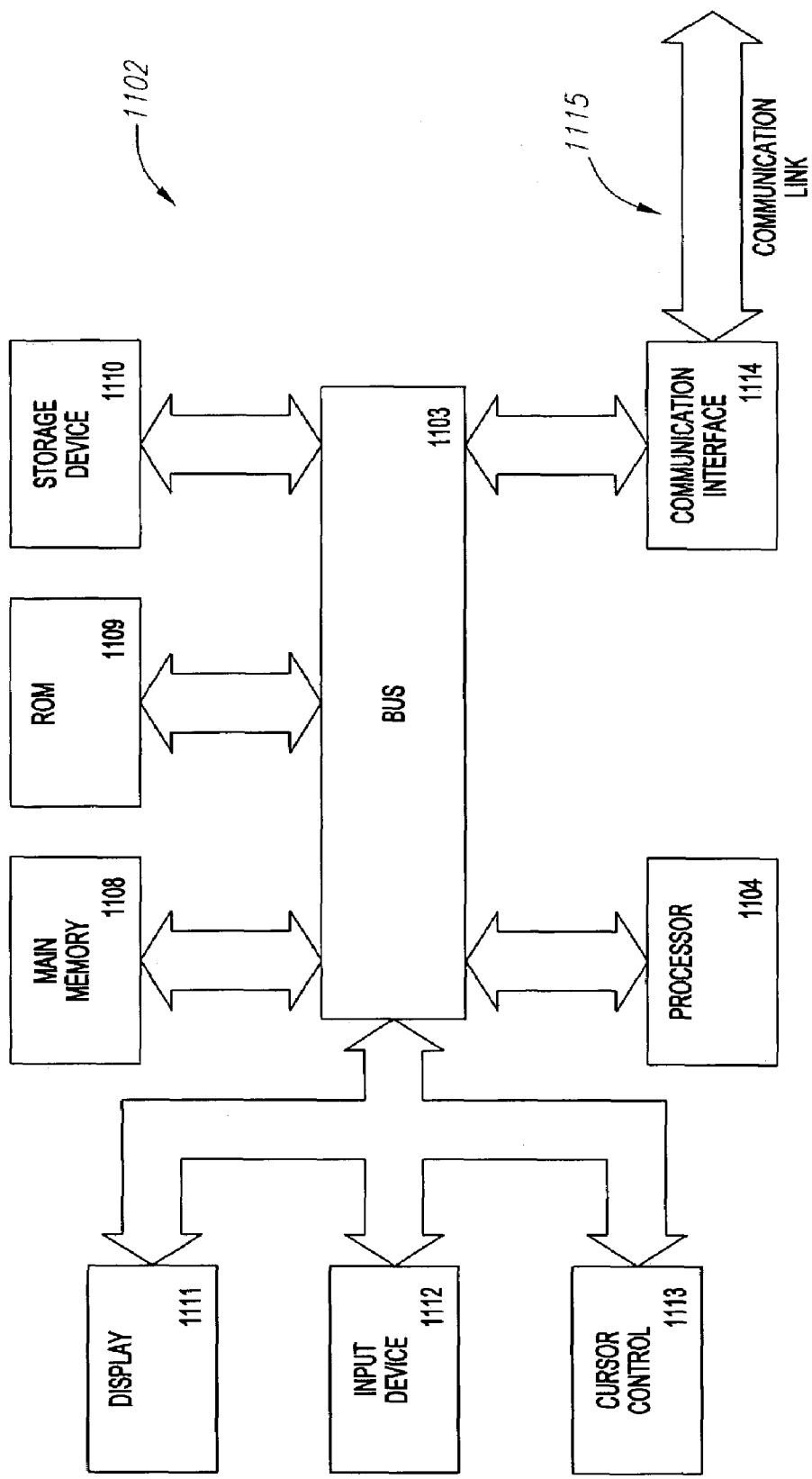
FIG. 11 is a representation of a processing unit in accordance with an embodiment of the invention.

Referring to FIG. 11, in an embodiment, each user station 1024 and the host computer 1022, each referred to generally as a processing unit, embodies a general architecture 1102. A processing unit includes a bus 1103 or other communication mechanism for communicating instructions, messages and data, collectively, information, and one or more processors 1104 coupled with the bus 1103 for processing information. A processing unit also includes a main memory 1108, such as a random access memory (RAM) or other dynamic storage device, coupled to the bus 1103 for storing dynamic data and instructions to be executed by the processor(s) 1104. The main memory 1108 also may be used for storing temporary data, i.e., variables, or other intermediate information during execution of instructions by the processor(s) 1104.

A processing unit may further include a read only memory (ROM) 1109 or other static storage device coupled to the bus 1103 for storing static data and instructions for the processor(s) 1104. A storage device 1110, such as a magnetic disk or optical disk, may also be provided and coupled to the bus 1103 for storing data and instructions for the processor(s) 1104.

A processing unit may be coupled via the bus 1103 to a display device 1111, such as, but not limited to, a cathode ray tube (CRT), for displaying information to a user. An input device 1112, including alphanumeric and other keys, is coupled to the bus 1103 for communicating information and command selections to the processor(s) 1104. Another type of user input device may include a cursor control 1113, such as, but not limited to, a mouse, a trackball, a fingerpad, or cursor direction keys, for communicating direction information and command selections to the processor(s) 1104 and for controlling cursor movement on the display 1111.

According to one embodiment of the invention, the individual processing units perform specific operations by their respective processor(s) 1104 executing one or more sequences of one or more instructions contained in the main memory 1108. Such instructions may be read into the main memory 1108 from another computer-usable medium, such as the ROM 1109 or the storage device 1110. Execution of the sequences of instructions contained in the main memory 1108 causes the processor(s) 1104 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1104. Such a medium may take many forms, including, but not limited to, non-volatile, volatile and transmission media. Non-volatile media, media that can retain information in the absence of power, includes the ROM 1109. Volatile media, i.e., media that can not retain information in the absence of power, includes the main memory 1108. Transmission media includes coaxial cables, copper wire and fiber optics, including the wires that comprise the bus 1103. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 1104 can retrieve information.

Various forms of computer-usable media may be involved in providing one or more sequences of one or more instructions to the processor(s) 1104 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1103 may receive the infrared signals and place the instructions therein on the bus 1103. The bus 1103 may carry the instructions to the main memory 1108, from which the processor(s) 1104 thereafter retrieves and executes the instructions. The instructions received by the main memory 1108 may optionally be stored on the storage device 1110, either before or after their execution by the processor(s) 1104.

Each processing unit may also include a communication interface 1114 coupled to the bus 1103. The communication interface 1114 provides two-way communication between the respective user stations 1024 and the host computer 1022. The communication interface 1114 of a respective processing unit transmits and receives electrical, electromagnetic or optical signals that include data streams representing various types of information, including instructions, messages and data.

A communication link 1115 links a respective user station 1024 and a host computer 1022. The communication link 1115 may be a LAN 1025, in which case the communication interface 1114 may be a LAN card. Alternatively, the communication link 1115 may be a PSTN 1028, in which case the communication interface 1114 may be an integrated services digital network (ISDN) card or a modem. Also, as a further alternative, the communication link 1115 may be a wireless network 1030.

A processing unit may transmit and receive messages, data, and instructions, including program, i.e., application, code, through its respective communication link 1115 and communication interface 1114. Received program code may be executed by the respective processor(s) 1104 as it is received, and/or stored in the storage device 1110, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

I claim:

1. A web-based client system for acquiring data from a web-enabled data server, comprising:

a web-based data collector, the data collector for collecting data from the web-enabled data server, the data collector for collecting data periodically, the data collector for determining the web-enabled data server to collect data from by referencing data source identifying information, the data collector for converting the data from a markup language format to a structured data storage format, the data collector for storing the data in a storage system.

2. The web-based client system of claim 1, wherein the data collector is a first data collector and the web-enabled data server is a first web-enabled data server, further comprising a second web-enabled data server, the second web-enabled data server for providing data from the storage system to a second data collector.

3. The web-based client system of claim 1, wherein the markup language format comprises Extensible Markup Language (XML).

4. The web-based client system of claim 1, wherein the markup language format comprises Hypertext Markup Language (HTML).

5. The web-based client system of claim 1, wherein the structured data format comprises Structured Query Language (SQL).

6. The web-based client system of claim 1, wherein the data source identifying information is received from the web-enabled data server.

7. The web-based client system of claim 1, wherein the data source identifying information is received from a user.

8. The web-based client system of claim 1, wherein the data source identifying information comprises a Uniform Resource Locator (URL).

9. The web-based client system of claim 1, wherein the data collector includes a scheduler, the scheduler for setting up a data collection schedule.

10. The web-based client system of claim 1, wherein the data collector is adapted to step through a list of URLs and collects the content pointed to by the URLs.

11. The web-based client system of claim 1, wherein the data collector is adapted to convert the markup language format to the structured data storage format by using a mapping function, the mapping function mapping markup language format data items to structured data storage format data items.

12. The web-based client system of claim 11, wherein the mapping function is adapted to map XML tags to SQL fields.

13. The web-based client system of claim 11, wherein the mapping function is adapted to map XML tags to database records.

14. The web-based client system of claim 11, wherein the mapping function comprises a first mapping function, further comprising a second mapping function, wherein the data collector is adapted to select the first mapping function based upon information contained in the data source identifying information.

15. The web-based client system of claim 1, wherein the data collector is adapted to store the data in the data storage system by inserting a new data item when the new data item appears in the data collected from the web-enabled data server, updating an existing data item content when a value of the existing data item in the data collected from the web-enabled data server changes, or deleting an old data item when the old data item is removed from the data collected from the web-enabled data server.

16. The web-based client system of claim 15, wherein the system is adapted to trigger an alarm when the content of an existing data item changes or when a new data item is added, or when an old data item is deleted.

17. The web-based client system of claim 16, wherein the system is adapted to take an action when the alarm is triggered.

18. The web-based client system of claim 1, wherein the system is written in an open scripting language, the open scripting language permitting publication of scripts.

19. The web-based client system of claim 1, wherein the system is adapted to be continuously running.

20. The web-based client system of claim 1, further comprising a web-based data processor, the data processor comprising a toolkit, the toolkit comprising a plurality of tools, each tool for performing a data processing operation on the storage system, the tools for processing the data stored in the storage system, the tools for presenting the data to a data user.

21. The web-based client system of claim 1, further comprising a web-based administrator module, the administrator module for configuring and maintaining the web-based client system, the administrator module comprising one or more web-based tools.

22. The web-based client system of claim 21, wherein the administrator module comprises a tool adapted to configure a list of URLs.

23. The web-based client system of claim 21, wherein the administrator module comprises a tool adapted to allow mapping of markup language format items to structured data storage format items.

24. The web-based client system of claim 23, wherein the markup language format items are XML tags and the structured data storage format items are database items in a relational database.

25. The web-based client system of claim 23, wherein the markup language format items are HTML tags and the structured data storage format items are database items in a relational database.

26. The web-based client system of claim 1, further comprising a web-enabled server, the server for converting structured data format data into Markup language format data and transmitting markup language data to the web-enabled client.

27. The web-based client system of claim 26, wherein the web-based client system is adapted to store data using a first data model, and the web based server system is adapted to store data in a second data model, different from the first data model.

28. A web-based data server system for transmitting data to a web-enabled client, comprising:

a web enabler agent, the web enabler agent for reading the data from a structured data formatted data storage system, the web enabler agent for converting the data from a structured data format to a markup language format, the web enabler agent for transmitting the data to a web-enabled client and;

a web-based data collector, the data collector for collecting data from a web-enabled data server, the data collector for collecting data periodically, the data collector for determining the web-enabled data server to collect data from by referencing data source identifying information, the data collector for converting the data from a markup language format to a structured data storage format, the data collector for storing the data in a storage system.

29. The web-based data server system of claim 28, wherein the markup language format comprises Extensible Markup Language (XML).

30. The web-based data server system of claim 28, wherein the markup language format comprises Hypertext Markup Language (HTML).

31. The web-based data server system of claim 28, wherein the structured data format comprises Structured Query Language (SQL).

32. The web-based data server system of claim 28, wherein the data collector is adapted to convert the structured data storage format to the markup language format by using a mapping function, the mapping function for mapping structured data storage format data items to markup language format data items.

33. The web-based data server system of claim 32, wherein the mapping function is adapted to map SQL fields and records to XML tags.

34. The web-based data server system of claim 28, wherein the system is written in an open scripting language, the open scripting language permitting publication of scripts.

35. The web-based data server system of claim 28, wherein the system is adapted to be continuously running.

36. The web-based data server system of claim 28, further comprising a web-based administrator module, the administrator module for configuring and maintaining the web-based data server system, the administrator module comprising one or more web-based tools.

37. The web-based data server system of claim 36, wherein the administrator module comprises a tool adapted to allow mapping of structured data storage format items to markup language format items.

38. The web-based data server system of claim 36, wherein the markup language format items are XML tags and the structured data storage format items are database items in a relational database.

39. The web-based data server system of claim 36, wherein the markup language format items are HTML tags and the structured data storage format items are database items in a relational database.

40. The web-based data server system of claim 28, further comprising a web-enabled client, the client for converting markup language format data into structured data format data and storing the structured data format data into a data storage system.

41. The web-based data server system of claim 40, wherein the web-based client system is adapted to store data using a first data model, and the web based data server system is adapted to store data in a second data model, different from the first data model.

* * * * *